(12) United States Patent
Foltz

(10) Patent No.: US 6,691,750 B1
(45) Date of Patent: Feb. 17, 2004

(54) FLOATING NOZZLE COLLAR FOR CAPLESS FILLER NECK

(75) Inventor: Dean C. Foltz, Shelbyville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 10/287,207

(22) Filed: Nov. 4, 2002

(51) Int. Cl.[7] .............................. B65B 1/04; B65B 3/00; B67C 3/00
(52) U.S. Cl. .................. 141/350; 141/348; 141/349; 220/86.2
(58) Field of Search .................. 141/348–350, 141/301, 302, 285; 220/86.2

(56) References Cited

U.S. PATENT DOCUMENTS

| | | | |
|---|---|---|---|
| 4,760,933 A | * | 8/1988 | Christner et al. ........... 220/86.2 |
| 4,924,923 A | * | 5/1990 | Boehmer et al. ........... 141/312 |
| 5,056,570 A | | 10/1991 | Harris et al. |
| 5,271,438 A | | 12/1993 | Griffin et al. |
| 5,730,194 A | | 3/1998 | Foltz |
| 5,937,922 A | * | 8/1999 | Hor et al. .................... 141/383 |
| 6,189,581 B1 | | 2/2001 | Harris et al. |
| 6,315,144 B1 | | 11/2001 | Foltz |
| RE37,776 E | | 7/2002 | Foltz |
| 6,431,228 B2 | | 8/2002 | Foltz et al. |
| 6,446,826 B1 | | 9/2002 | Foltz et al. |

* cited by examiner

*Primary Examiner*—Timothy L. Maust
(74) *Attorney, Agent, or Firm*—Barnes & Thornburg

(57) ABSTRACT

A filler neck closure assembly includes a nozzle receiver associated with a vehicle fuel tank and a fuel-discharge control collar adapted to receive therein a fuel-dispensing pump nozzle inserted into the nozzle receiver during fuel tank refueling.

21 Claims, 6 Drawing Sheets

FLOATING NOZZLE COLLAR FOR CAPLESS FILLER NECK

BACKGROUND AND SUMMARY

The present disclosure relates to a filler neck closure assembly for a vehicle fuel tank, and particularly to a filler neck closure for use in a capless fuel tank filler neck. More particularly, the present disclosure relates to a fuel-dispensing pump nozzle seal for use in a filler neck closure assembly.

A removable fuel cap with a sealing gasket is typically used to close the open end of a fuel tank filler neck. After an attendant fills the fuel tank and withdraws the pump nozzle from the filler neck, the fuel cap is attached to the filler neck so that the sealing gasket forms a seal between the fuel cap and the filler neck. Thus, the fuel cap closes the open end of the filler neck to block discharge of liquid fuel and fuel vapor from the fuel tank through the filler neck. Some fuel caps are provided with pressure-relief and vacuum-relief valves to permit some controlled venting of fuel vapors in the filler neck while the fuel cap is mounted on the filler neck.

It has been observed that fuel caps are often lost or damaged over time and, as a result, the open end of the filler neck might not be closed and sealed in accordance with original equipment specifications during operations of the vehicle. Accordingly, a filler neck configured to "open" automatically as a fuel-dispensing pump nozzle is inserted into the filler neck during refueling and "close" automatically once the pump nozzle is withdrawn from the filler neck without requiring an attendant to reattach a fuel cap to the filler neck would be an improvement over many conventional capped filler neck systems. Although conventional fuel caps function to close filler necks in a satisfactory manner, it is thought that a capless filler neck could make vehicle refueling more convenient for consumers because no action other than inserting a pump nozzle into the outer end of the filler neck would be required to begin refueling a vehicle.

According to the present disclosure, a filler neck closure assembly includes a nozzle receiver associated with a vehicle fuel tank filler neck. The assembly also includes a fuel-discharge control collar mounted for movement relative to the nozzle receiver.

During fuel tank refueling, a fuel-dispensing pump nozzle is extended by a refueling attendant into the filler neck through a collar aperture formed in the fuel-discharge control collar and a nozzle-receiving passageway formed in the nozzle receiver. The control collar is normally "at rest" on the nozzle receiver to block unwanted discharge of certain "residual" droplets of liquid fuel present on a splash-back closure plate included in the nozzle receiver during initial insertion of the pump nozzle into the nozzle receiver. The control collar is also arranged to move a limited distance away from the nozzle receiver should an automatic pump nozzle shut-off system associated with the pump nozzle fail to work properly during fuel tank refueling so that any liquid fuel or fuel vapor discharged from the filler neck is diverted by the fuel-discharge control collar to a designated spray-diversion region within the filler neck closure assembly.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which.

DETAILED DESCRIPTION

Figure 1:
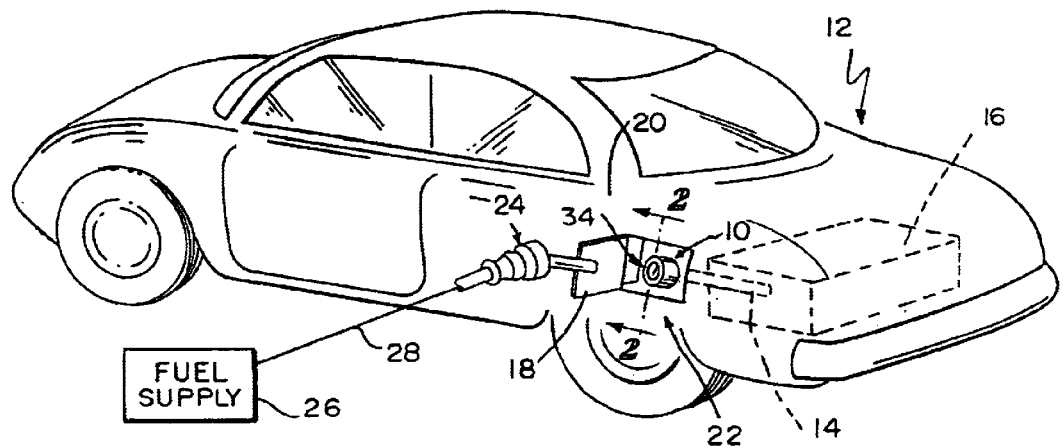
FIG. 1 is a perspective view of a vehicle showing an outer filler neck access door moved to an opened position relative to a vehicle body panel to expose a filler neck closure assembly coupled to a filler neck leading to a vehicle fuel tank and showing a fuel-dispensing pump nozzle coupled to a fuel supply and configured to be inserted into the filler neck closure assembly during vehicle refueling to discharge liquid fuel into the filler neck leading to the vehicle fuel tank.
Figure 2:
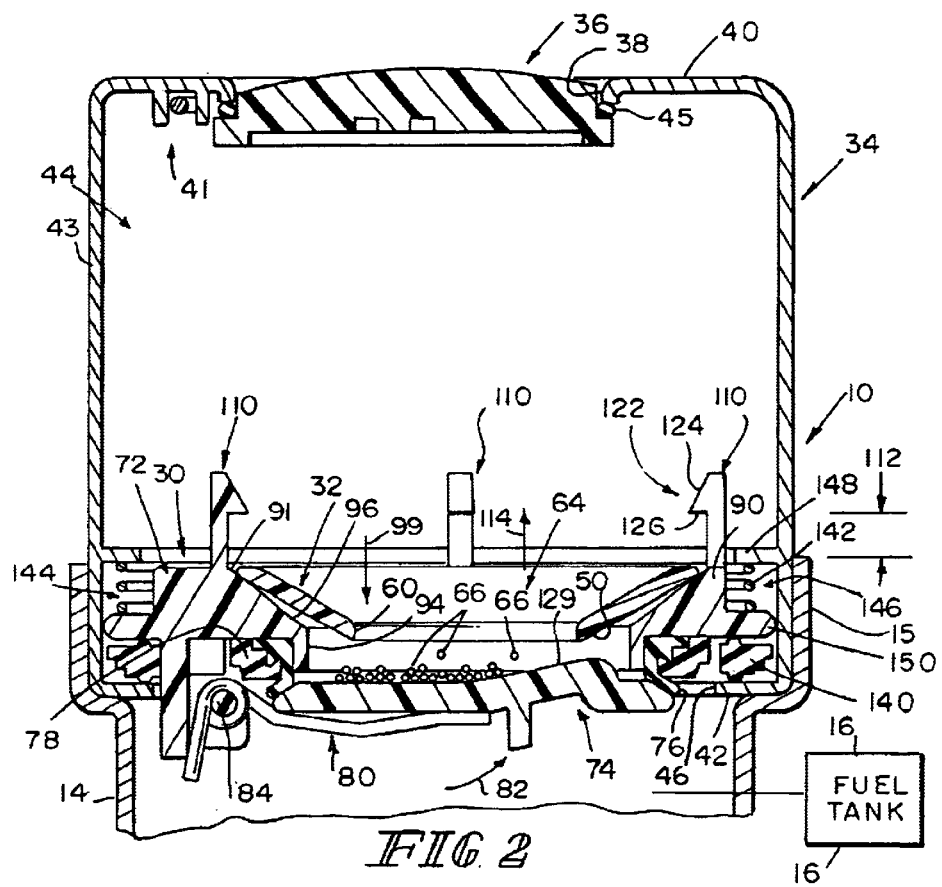
FIG. 2 is a sectional view of the filler neck closure assembly taken along line 2–2 of FIG. 1 showing some "residual" droplets of liquid fuel present on an exterior surface of a pivotable splash-back closure plate included in the filler neck closure assembly and showing a floating fuel-discharge control collar positioned to lie and move up and down above the splash-back closure plate to define a chamber therebetween containing the residual droplets of liquid fuel.

As shown in FIGS. 1 and 2, a filler neck closure assembly 10 is provided in a vehicle 12 normally to close a filler neck 14 extending from a fuel tank 16 onboard vehicle 12. During refueling, an outer filler neck access door 18 is moved relative to a vehicle body panel 20 to expose filler neck closure assembly 10 as shown, for example, in FIG. 1. Filler neck closure assembly 10 is located in a chamber 22 formed in vehicle 12 so that assembly 10 is "out of sight" when access door 18 is closed. A fuel-dispensing pump nozzle 24 is coupled to a fuel supply 26 by a hose 28 and configured to be inserted into filler neck closure assembly 10 during vehicle refueling to discharge liquid fuel into filler neck 14 as suggested in FIG. 7.

Figure 6:
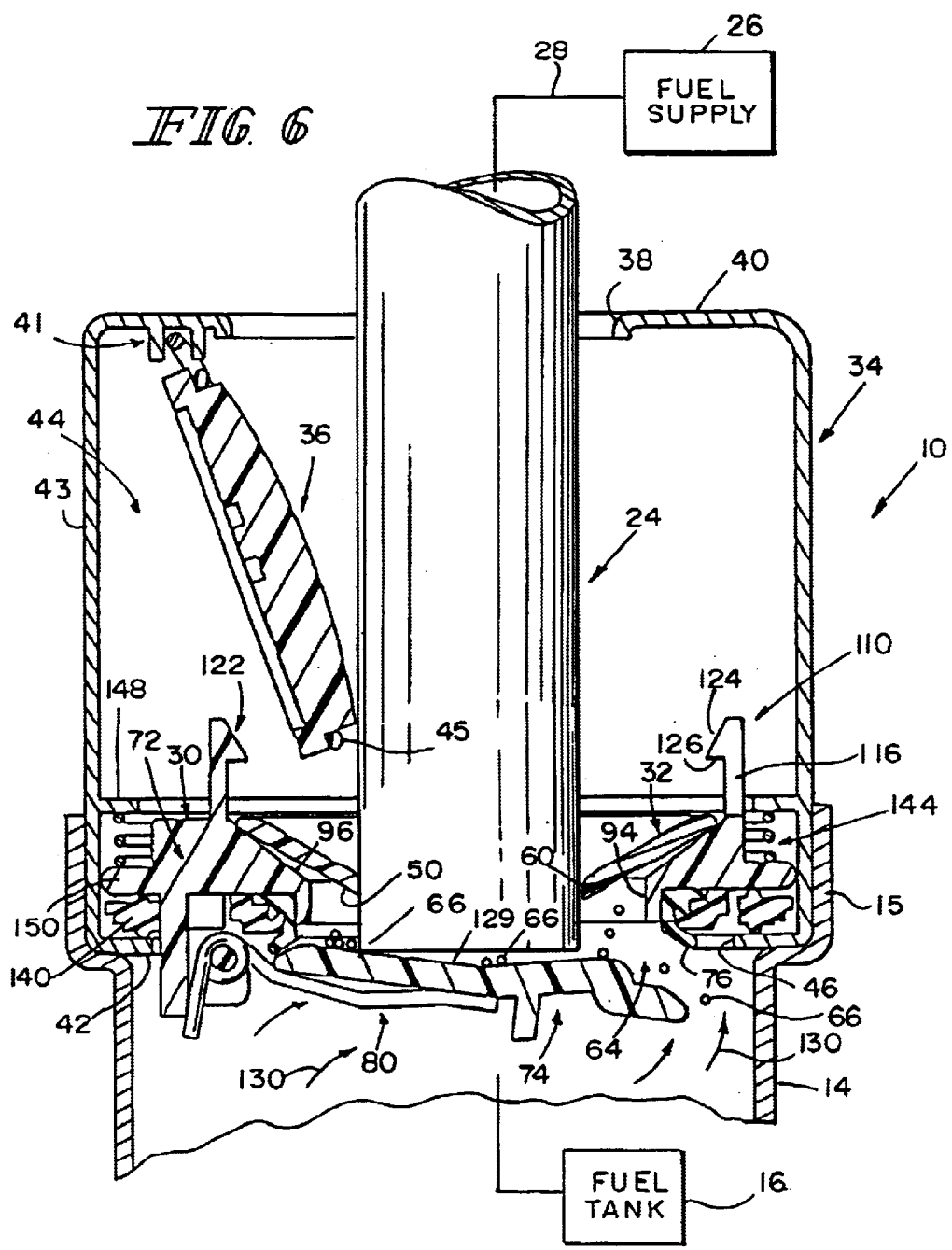
FIG. 6 is a sectional view similar to FIG. 5 showing pivoting movement of the pivotable splash-back closure plate in response to further "inward" movement of the pump nozzle through the collar aperture to engage and pivot the pivotable splash-back closure plate and showing use of the floating collar on the nozzle to provide means for blocking discharge of the residual liquid fuel droplets present on the exterior surface of the splash-back closure plate through an annular channel formed around the pump nozzle, which liquid fuel droplets are entrained in pressurized fuel vapor that escapes from the filler neck and flows upwardly through the annular channel in a direction toward the "opened" appearance cover when the pump nozzle pushes and pivots the splash-back closure plate to a "just-opened" position.
Figure 7:
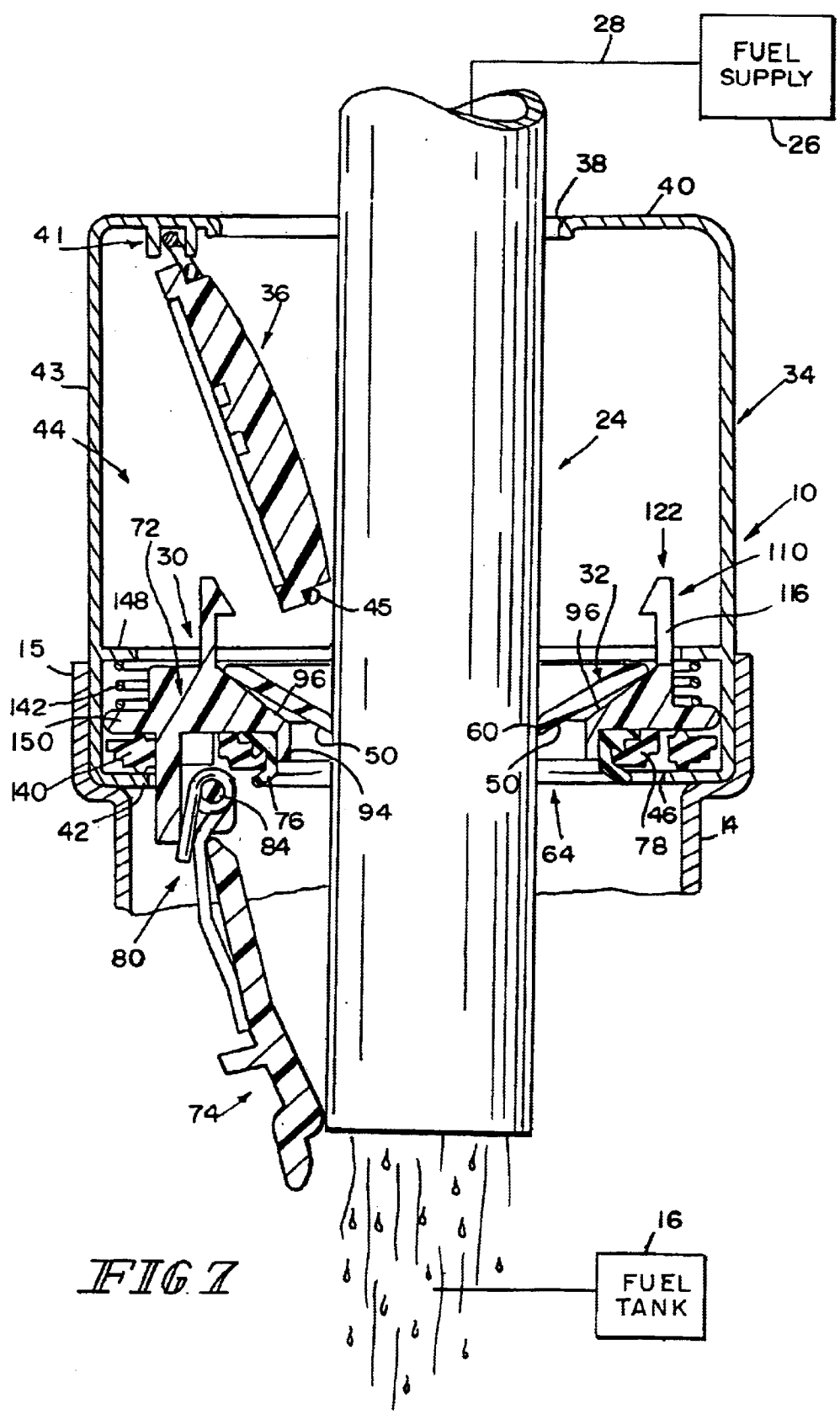
FIG. 7 is a sectional view similar to FIG. 6 showing still further inward movement of the pump nozzle into the filler neck and discharge of liquid fuel from the pump nozzle during normal fuel tank refueling.
Figure 8:
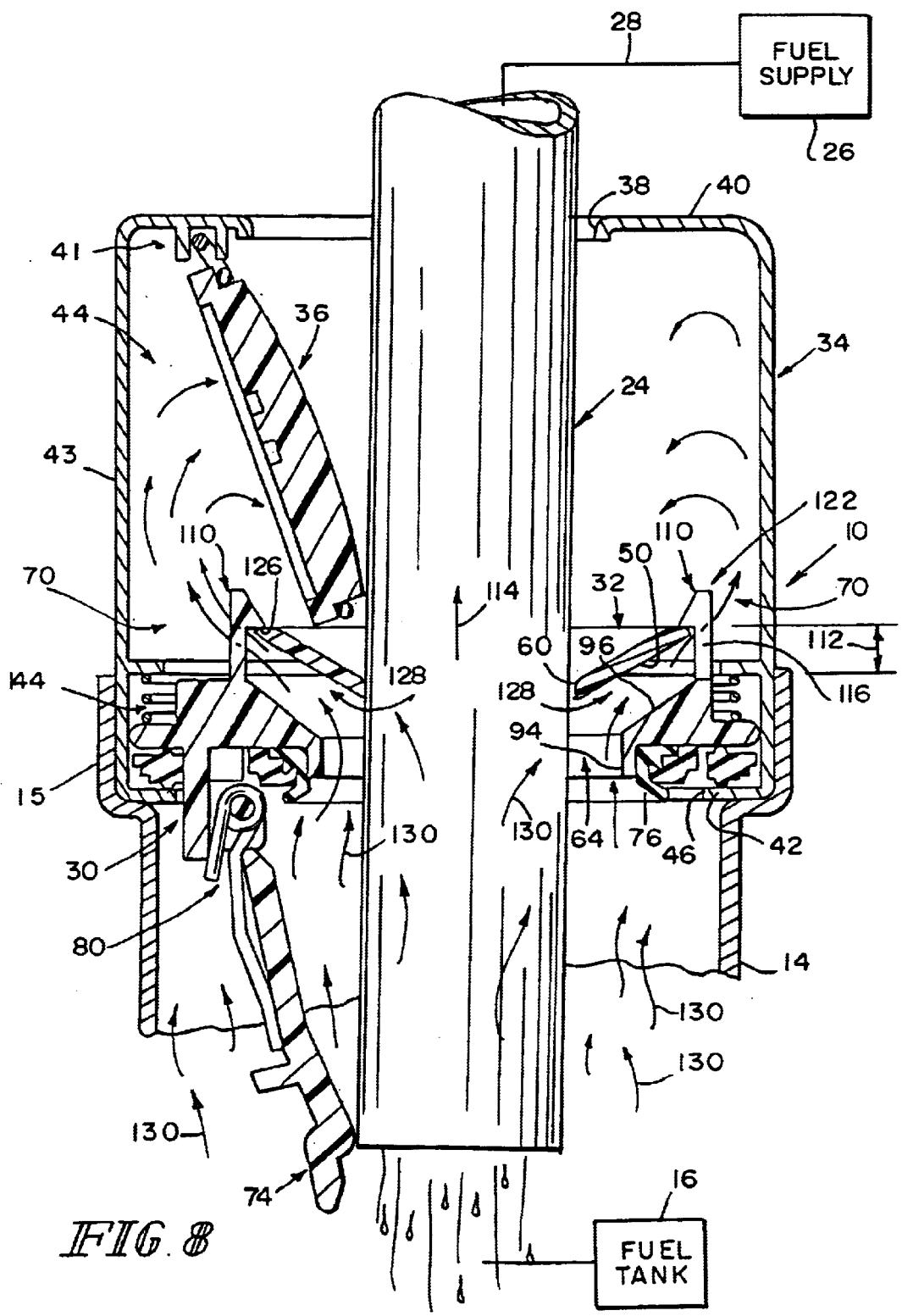
FIG. 8 is a sectional view similar to FIG. 7 showing free-floating movement of the floating fuel-discharge control collar upwardly away from the splash-back closure plate (and relative to the pump nozzle) to expand the volume of the chamber defined between floating collar and splash-back closure plate during an automatic pump nozzle shut-off failure to divert spray of pressurized liquid fuel and fuel vapor passing from the fuel tank to the filler neck closure assembly into a "spray-diversion" region provided in the filler neck closure assembly in a location between the splash-back closure plate and the appearance door.

Filler neck closure assembly 10 includes a nozzle receiver 30 sized to admit fuel-dispensing pump nozzle 24 therein during fuel tank refueling as suggested in FIGS. 7 and 8. Also included in filler neck closure assembly 10 is a fuel-discharge control collar 32 sized to admit pump nozzle 24 therein to regulate discharge of pressurized liquid fuel and fuel vapor from filler neck 14 as suggested in FIGS. 6 and 8. Nozzle receiver 30 and fuel-discharge control collar 32 cooperate to provide means for admitting fuel-dispensing pump nozzle 24 into filler neck 14 during fuel tank refueling.

Figure 5:
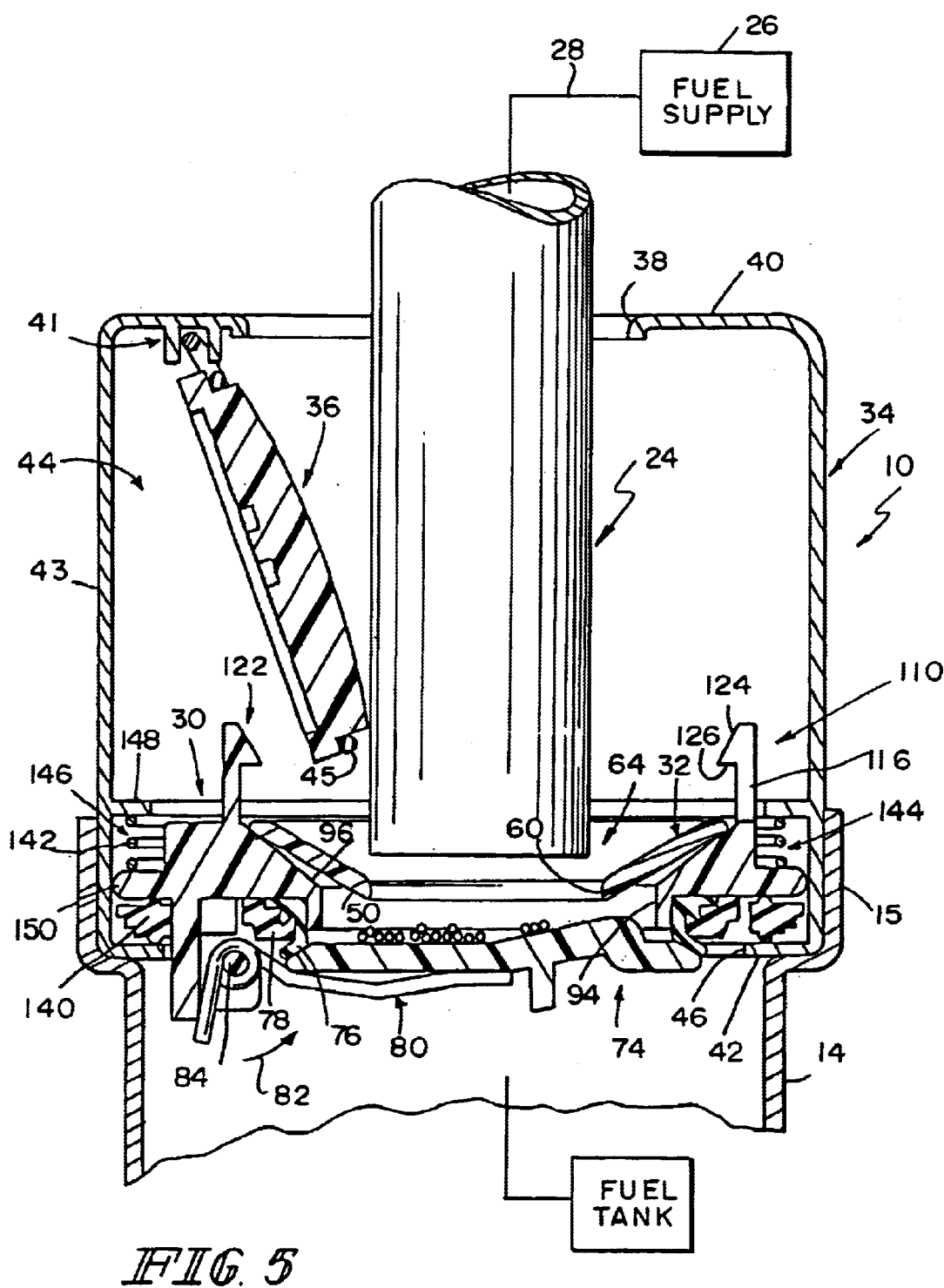
FIG. 5 is a sectional view similar to FIG. 2 showing insertion of the pump nozzle into an outer portion of the filler neck closure assembly but before the pump nozzle is moved through the collar aperture to engage and pivot the pivotable splash-back closure plate.

Filler neck closure assembly 10 further includes a filler neck closure housing 34 and an appearance door 36 mounted for movement relative to the housing 34 to open and close an outer aperture 38 that is formed in housing 34 as suggested in FIGS. 2 and 5. In the illustrated embodiment, housing 34 is configured to be coupled to an outer end 15 of filler neck 14 to allow a fuel-dispensing pump nozzle 24 to pass through opened outer aperture 38 and passageways formed in nozzle receiver 30 and fuel-discharge control collar 32 during fuel tank refueling as suggested in FIGS. 5–8.

Filler neck closure housing 34 includes a top wall 40, a bottom wall 42 arranged to lie in spaced-apart relation to top wall 40, and a side wall 43 appended to a perimeter edge of top wall 40 and arranged to extend between top and bottom walls 40, 42 to define an interior region 44 of housing 34. Top wall 40 is formed to include outer aperture 38. Appearance door 36 is coupled to top wall 40 at door mount 41 to move from a closed position shown in FIG. 2 to an opened position shown in FIGS. 5–8. An o-ring seal 45 is carried on appearance door 36 and arranged to mate with an edge of top wall 40 to establish a sealed connection between door 36 and top wall 40 upon movement of door 36 to the closed position. In the illustrated embodiment, bottom wall 42 has an annular shape and is formed to include an inner aperture 46 opening into filler neck 14.

Figure 3:
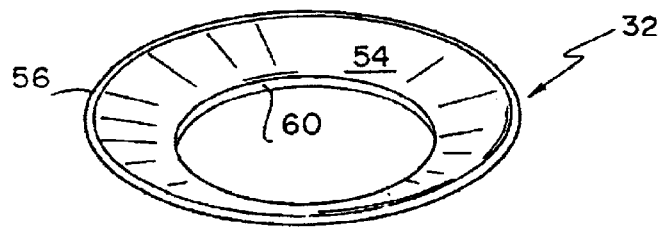
FIG. 3 is a perspective view of the floating fuel-discharge control collar of FIG. 2 showing a frustoconical interior surface defining a pump nozzle-receiving passageway extending through the collar and terminating at a collar aperture.
Figure 4:
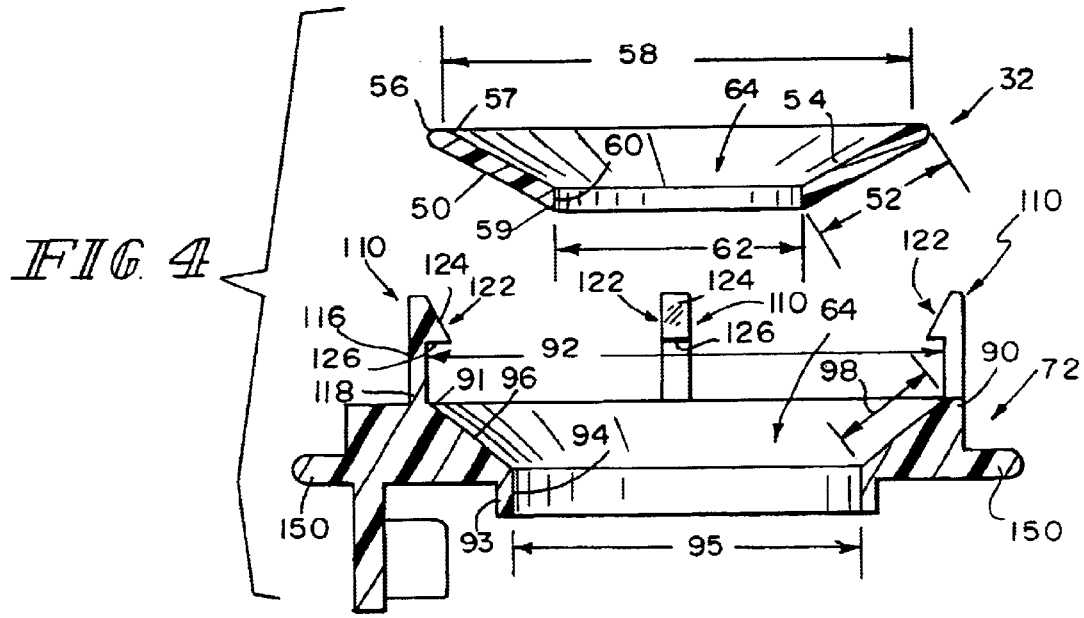
FIG. 4 is a sectional view of the fuel-discharge control collar and a portion of the filler neck closure assembly of FIG. 2.

Fuel-discharge control collar 32 is shown, for example, in FIGS. 3 and 4 and is adapted to mate with nozzle receiver 30 and pump nozzle 24 as shown, for example, in FIGS. 6-8. In the illustrated embodiment, fuel-discharge control collar 32 includes a frustoconical exterior surface 50 having a slant height 52 and a frustoconical inner surface 54. Collar 32 includes an annular radially outer edge 56 formed to define an outer aperture 57 having a diameter 58, an annular radially inner edge 59 formed to define a collar aperture 60 having a diameter 62, and a nozzle-receiving passageway 64 defined by inner surface 54 and arranged to communicate with both outer aperture 57 and collar aperture 60 as shown best in FIG. 4. Diameter 58 of annular outer end 56 is greater than diameter 62 of annular inner end 59. Collar aperture 60 is sized to admit fuel-dispensing pump nozzle 24 as suggested in FIGS. 6–8 and is slightly larger than the outer diameter of pump nozzle 24.

Nozzle receiver 30 is formed to include a nozzle-receiving passageway 64 as shown best in FIGS. 7 and 8. Fuel-discharge control collar 32 is positioned to lie in an "at-rest" position in nozzle-receiving passageway 64 formed in nozzle receiver 30 during an initial stage of fuel tank refueling as shown, for example, in FIG. 6. In this position, fuel-discharge control collar 32 cooperates with pump nozzle 24 and nozzle receiver 30 to block discharge of liquid fuel droplets 66 extant in nozzle-receiving passageway 64 (as shown in FIGS. 2 and 6) into interior region 44 of housing 10 and also to the surroundings via outer aperture 38 formed in top wall 40. Fuel-discharge control collar 32 is also positioned to move in nozzle-receiving passageway 64 during an automatic pump nozzle shut-off failure to divert spray of pressurized liquid fuel and fuel vapor 68 passing from filler neck 14 into a "spray-diversion" region 70 provided in interior region 44 of filler neck closure housing 34 near side wall 43 as shown, for example, in FIG. 8.

Nozzle receiver 30 includes a closure support 72 formed to include the pump nozzle-receiving passageway 64 and a closure plate 74 mounted on closure support 72 for movement between a closed position closing pump nozzle-receiving passageway 64 a shown, for example, in FIGS. 2 and 5 and an opened position opening pump nozzle-receiving passageway 64 as shown, for example, in FIGS. 7 and 8. Nozzle receiver 30 also includes an annular sealing gasket 76 fixed in place on closure support 72 by a retainer 78 and a torsion spring 80 coupled to closure support 72 and to closure plate 74 and configured to urge closure plate 74 in a counterclockwise direction 82 about a pivot pin 84 normally to engage annular sealing gasket 76 to close pump nozzle-receiving passageway 64 as shown, for example, in FIG. 2.

As shown best in FIG. 4, closure support 72 includes an outer end 90 defining a large-diameter outer aperture 91 having a diameter 92 and opening into pump nozzle-receiving passageway 64. Closure support 72 also includes an inner end 93 defining a small-diameter inner aperture 94 having a diameter 95 and opening into pump nozzle-receiving passageway 64. A frustoconical inclined wall 96 extends from large-diameter outer aperture 91 to small-diameter inner aperture 94. Diameter 92 is greater than diameter 94 as shown in FIG. 4. Inclined wall 96 has a slant height 98.

As suggested in FIG. 2, fuel-discharge control collar 32 includes an exterior surface 50 that is arranged to engage inclined wall 96 of closure support 72 to block movement of fuel-discharge control collar 32 downwardly (in direction 99) out of pump nozzle-receiving passageway 64 through small-diameter inner aperture 94 formed in closure support 72. Inclined wall 96 has a first frustoconical shape and exterior surface 50 of fuel-discharge control collar 32 has a second frustoconical shape that is different from the first frustoconical shape as shown, for example, in FIG. 2. Exterior surface 50 of fuel-discharge control collar 32 has a slant height 52 that is greater than slant height 98 of inclined wall 96. Collar aperture 60 has a diameter 62 that is less than diameter 95 of small-diameter inner aperture 94 formed in closure support 72.

Nozzle receiver 30 further includes cantilevered collar retainers 110 coupled to closure support 72 and arranged to engage fuel-discharge control collar 32 once fuel-discharge control collar 32 has moved a predetermined distance 112 in direction 114 away from closure support 72 as suggested in FIG. 8. Four collar retainers 110 (three of which are shown in FIGS. 2 and 4) are coupled to outer end 90 of closure support 72 and positioned to lie in uniformly, circumferentially spaced-apart relation to one another about the mouth of large-diameter aperture 91.

Each collar retainer 110 includes a leg 116 having a lower end 118 appended to outer end 90 of closure support 72 and an upper end 120 arranged to lie in spaced-apart relation to closure support 72. A collar blocker 122 is appended to upper end 120 and configured to engage annular outer end 56 of fuel-discharge control collar 32 to limit outward movement of collar 32 in direction 114 as suggested, for example, in FIG. 8: Collar blocker 122 includes a frustoconical outwardly facing surface 124 configured to cam against collar 32 to spread cantilevered collar retainers 110 radially outwardly during installation of collar 32 in its mounted position in nozzle-receiving passageway 64 in nozzle receiver 30. Each collar blocker 122 also includes an annular lip 126 arranged to extend radially inwardly from its companion leg 116 to stop outer movement of collar 32 in direction 114 at predetermined distance 112 measured from closure support 72.

In use, as suggested in FIG. 8, collar retainers 110 cooperate to provide retainer means for allowing limited movement of fuel-discharge control collar 32 away from inclined wall 96 to assume an opened position to open a discharge channel 128 defined between nozzle receiver 30 and a fuel-dispensing pump nozzle 24 extending through collar aperture 60 and through pump nozzle-receiving passageway 64. Such limited movement allows pressurized liquid fuel and fuel vapor 130 discharged from filler neck 14 into pump nozzle-receiving passageway 64 through small-diameter inner aperture 94 to apply a lifting force to exterior surface 50 of fuel-discharge control collar 32 to allow pressurized liquid fuel and fuel vapor 130 to pass through large-diameter outer aperture 91 in closure support 72. Spray-diversion region 70 is located between closure support 72 and outer aperture 38 to receive pressurized liquid fuel and fuel vapor 130 discharged through discharge channel 128 upon movement of fuel-discharge control collar 32 to the opened position as shown, for example, in FIG. 8.

Fuel-discharge control collar 32 is formed to include a collar aperture 60 adapted to receive a fuel-dispensing pump nozzle 24 therein during fuel tank refueling as suggested in FIGS. 6–8. Fuel-discharge control collar 32 includes an axially inwardly facing frustoconical exterior surface 50 arranged to face toward axially outwardly facing funnel-shaped surface 96 of closure support 72. Axially inwardly facing frustoconical exterior surface 50 cooperates with axially outwardly facing funnel-shaped surface 96 to define flow control means (1) for normally blocking flow of pressurized liquid fuel and fuel vapor 130 through flow-diversion passageway 128 upon movement of the closure plate 74 away from the closed position and toward the opened position (as shown in FIG. 6) so that any residual droplets of liquid fuel 66 present on an axially outwardly facing exterior surface 129 of the closure plate 74 are unable to leave the pump nozzle-receiving passageway 64 via the flow-diversion passageway 128 and (2) for allowing flow of pressurized liquid fuel and fuel vapor 130 to flow through the flow-diversion passageway 128 to reach a spray-diversion region 70 away from the nozzle receiver 30 upon movement of the closure plate 74 toward the opened position and exposure of axially inwardly facing frustoconical exterior surface 50 of fuel-discharge control collar 32 to a pressure in excess of a predetermined pressure to apply a lifting force to fuel-discharge control collar 32 to move fuel-discharge control collar 32 in an axially outward direction 114 away from the closure support 72 to open flow-diversion passageway 128. The axially outwardly facing funnel-shaped surface 96 of closure support 72 and side wall 43 of filler neck closure housing 34 cooperate to define spray-diversion region 70 therebetween in interior region 44 of filler neck closure housing 34 as suggested, for example, in FIG. 8.

In the illustrated embodiment, nozzle receiver 30 cooperated with a sealing gasket 140 and a spring 142 to form a pressure-relief valve assembly 144 mounted for movement in a chamber 146 provided in interior region 44 of filler neck closure housing 34. Housing 34 includes a radially inwardly extending flange 148 positioned to lie in spaced-apart relation to annular bottom wall 42 to define chamber 146 therebetween as shown in FIG. 2.

Annular sealing plate 150 is included in closure support 72 and arranged to lie between annular flange 148 and annular bottom wall 42 as shown in FIG. 2. Sealing gasket 140 is positioned to lie between annular sealing plate 150 and annular-bottom wall 42. Spring 142 is positioned to lie between annular flange 148 and annular sealing plate 150 and, in the illustrated embodiment, is a coiled compression spring. Spring 142 is configured to provide means for yieldably urging annular sealing plate 150 in downward direction 99 to engage sealing gasket 140 and maintain sealing gasket 140 in contact with annular bottom wall 42 to establish a liquid fuel and fuel vapor seal therebetween. When the pressure of fuel vapor in filler neck 14 exceeds a predetermined level, a lifting force is applied to nozzle receiver 30 to move annular sealing plate 150 upwardly in direction 114 to vent pressurized fuel vapor 130 from filler neck 14. Reference is hereby made to U.S. RE37,776, which is incorporated by reference herein, for a description of a suitable pressure-relief valve subassembly.

What is claimed is:

1. A filler neck closure assembly for a vehicle fuel tank filler neck, the assembly comprising
 a nozzle receiver adapted to be coupled to a fuel tank filler neck to receive a fuel-dispensing pump nozzle during fuel tank refueling, the nozzle receiver including a closure support formed to include a pump nozzle-receiving passageway extending therethrough and a closure mounted on the closure support for movement between a closed position closing the pump nozzle-receiving passageway and an opened position opening the pump nozzle-receiving passageway and
 a fuel-discharge control collar formed to include a collar aperture, the fuel-discharge control collar being positioned to move in the pump nozzle-receiving passageway formed in the closure support of the nozzle receiver to block flow of liquid fuel and fuel vapor discharged from the filler neck through a discharge channel defined between the closure support and a fuel-dispensing pump nozzle extending through the collar aperture and through the pump nozzle-receiving passageway during a tank refueling operation.

2. The assembly of claim 1, wherein the fuel-discharge control collar is arranged to move relative to the nozzle receiver and adapted to move along a fuel-dispensing pump nozzle extending through the collar aperture opening to open the discharge conduit upon exposure of an exterior surface of the fuel-discharge control collar to pressurized liquid fuel and fuel vapor passing through the pump nozzle-receiving passageway formed in the closure support of the nozzle receiver.

3. The assembly of claim 1, wherein the fuel-discharge control collar includes a radially inner edge formed to define the collar aperture, a radially outer edge located in spaced-apart relation to the radially inner edge, and an exterior surface extends from the radially inner edge to the radially outer edge.

4. The assembly of claim 3, wherein the exterior surface of the fuel-discharge control collar has a frustoconical shape.

5. The assembly of claim 3, wherein the radially outer edge is formed to define an outer opening and the fuel-discharge control collar also includes a frustoconical interior surface arranged to extend from the radially outer edge to the radially inner edge to define an interior region adapted to receive a potion of a fuel-dispensing pump nozzle therein.

6. The assembly of claim 3, wherein the nozzle receiver includes a closure support formed to include the pump nozzle-receiving passageway and a collar retainer coupled to the closure support and configured to provide means for allowing limited movement of the fuel-discharge control collar relative to the closure support.

7. A filler neck closure assembly for a vehicle fuel tank filler neck, the assembly comprising
  a nozzle receiver adapted to be coupled to a fuel tank filler neck to receive a fuel-dispensing pump nozzle during fuel tank refueling, the nozzle receiver being formed to include a pump nozzle-receiving passageway extending therethrough and
  a fuel-discharge control collar formed to include a collar aperture, the fuel-discharge control collar being positioned to move in the pump nozzle-receiving passageway formed in the nozzle receiver to block flow of liquid fuel and fuel vapor discharged from the filler neck through a discharge channel defined between the nozzle receiver and a fuel-dispensing pump nozzle extending through the collar aperture and through the pump nozzle-receiving passageway during a tank refueling operation, wherein the nozzle receiver includes a closure support formed to include the pump nozzle-receiving passageway, the closure support includes an outer end defining a large-diameter outer aperture having a first diameter and opening into the pump nozzle-receiving passageway, an inner end defining a small-diameter inner aperture having a second diameter and opening into the pump nozzle-receiving passageway, the second diameter being less than the first diameter, and an inclined wall extending from the large-diameter outer aperture to the small-diameter inner aperture, and the fuel-discharge control collar includes an exterior surface arranged to engage the inclined wall of the closure support to block movement of the fuel-discharge control collar out of the pump nozzle-receiving passageway through the small-diameter inner aperture formed in the closure support.

8. The assembly of claim 7, wherein the inclined wall has a first frustoconical shape and the exterior surface of the fuel-discharge control collar has a second frustoconical shape that is different from the first frustoconical shape.

9. The assembly of claim 8, wherein the inclined wall has a first slant height, the exterior surface has a second slant height that is greater than the first slant height, and the collar aperture has a diameter that is less than the second diameter of the small-diameter inner aperture.

10. The assembly of claim 8, wherein the fuel-discharge control collar further includes a frustoconical interior surface formed to define a pump nozzle-receiving passageway extending through the fuel-discharge control collar and terminating at the collar aperture.

11. The assembly of claim 7, wherein the nozzle receiver further includes retainer means for allowing limited movement of the fuel-discharge control collar away from the inclined wall to assume an opened position to open the discharge channel so that pressurized liquid fuel and fuel vapor discharged from the filler neck into the pump nozzle-receiving passageway through the small-diameter inner aperture will apply a lifting force to the exterior surface of the fuel-discharge control collar to move the fuel-discharge control collar to the opened position to allow pressurized liquid fuel and fuel vapor to pass through the large-diameter outer aperture.

12. The assembly of claim 11, wherein the retainer means includes cantilevered collar retainers coupled to the closure support and arranged to engage the fuel-discharge control collar once the fuel-discharge control collar has moved a predetermined distance away from the closure support.

13. The assembly of claim 11, further comprising a filler neck closure housing formed to include an outer aperture sized to receive a pump nozzle therein and to define a spray-diversion region located between the closure support and the outer aperture to receive pressurized liquid fuel and fuel vapor discharged through the discharge channel upon movement of the fuel-discharge control collar to the opened position.

14. The assembly of claim 11, further comprising a filler neck closure housing containing the closure support and an appearance door mounted for movement relative to the filler neck closure housing to open and close an outer aperture that is formed in the filler neck closure housing and is sized to receive a pump nozzle therein, and wherein the filler neck closure housing includes a top wall positioned to lie in spaced-apart relation to the closure support and a side wall arranged to extend between the top wall and the closure support to define an interior region of the filler neck closure housing, the retainer means is arranged to lie in the interior region of the filler neck closure housing and in spaced-apart relation to the side wall to define a spray-diversion region therebetween, and the exterior surface of the fuel-discharge control collar is inclined to direct pressurized liquid fuel and fuel vapor exiting the discharge channel into the spray-diversion region upon movement of the fuel-discharge control collar to the opened position.

15. A filler neck closure assembly for a vehicle fuel tank filler neck, the assembly comprising
  a nozzle receiver adapted to be coupled to a fuel tank filler neck to receive a fuel-dispensing pump nozzle during fuel tank refueling, the nozzle receiver being formed to include a pump nozzle-receiving passageway extending therethrough and
  a fuel-discharge control collar formed to include a collar aperture, the fuel-discharge control collar being positioned to move in the pump nozzle-receiving passageway formed in the nozzle receiver to block flow of liquid fuel and fuel vapor discharged from the filler neck through a discharge channel defined between the nozzle receiver and a fuel-dispensing pump nozzle extending through the collar aperture and through the pump nozzle-receiving passageway during a tank refueling operation, wherein the fuel-discharge control collar is arranged to move relative to the nozzle receiver and adapted to move along a fuel-dispensing pump nozzle extending through the collar aperture opening to open the discharge conduit upon exposure of an exterior surface of the fuel-discharge control collar to pressurized liquid fuel and fuel vapor passing through the pump nozzle-receiving passageway formed in the nozzle receiver and wherein the exterior surface of the fuel-discharge control collar is configured to provide diversion means for diverting pressurized liquid fuel and fuel vapor exiting the discharge channel to a spray-diversion region provided around a peripheral edge of the nozzle receiver.

16. The assembly of claim 15, wherein the nozzle receiver further includes a wall facing the exterior surface of the fuel-discharge control collar and retainer means for allowing limited movement of the fuel-discharge control collar away from the wall to an opened position to open the discharge channel so that pressurized liquid fuel and fuel vapor is conducted by the diversion means to the spray-diversion region.

17. The assembly of claim 15, wherein the exterior surface of the fuel-discharge control collar is frustoconical.

18. A filler neck closure assembly for a vehicle fuel tank filler neck, the assembly comprising a nozzle receiver adapted to be coupled to a fuel tank filler neck to receive a fuel-dispensing pump nozzle during fuel tank refueling, the nozzle receiver including a closure support and a closure plate mounted on the closure support for movement between a closed position closing a pump nozzle-receiving passageway formed in the closure support and an opened position opening the pump nozzle-receiving passageway to admit a fuel-dispensing pump nozzle therein during fuel tank refueling, the closure support including an axially outwardly facing funnel-shaped surface configured to define the pump nozzle-receiving passageway, and a fuel-discharge control collar formed to include a collar aperture adapted to receive a fuel-dispensing pump nozzle therein during fuel tank refueling, the fuel-discharge control collar including an axially inwardly facing frustoconical exterior surface arranged to face toward the axially outwardly facing funnel-shaped surface, the axially inwardly facing frustoconical exterior surface of the fuel-discharge control collar cooperating with the axially outwardly facing funnel-shaped surface to define flow control means for normally blocking flow of pressurized liquid fuel and fuel vapor through a flow-diversion passageway upon movement of the closure plate away from the closed position and toward the opened position so that any residual droplets of liquid fuel present on an axially outwardly facing exterior surface of the closure plate are unable to leave the pump nozzle-receiving passageway via the flow-diversion passageway and for allowing flow of pressurized liquid fuel and fuel vapor to flow through the flow-diversion passageway to reach a spray-diversion region away from the nozzle receiver upon movement of the closure plate toward the opened position and exposure of the axially inwardly facing frustoconical exterior surface of the fuel-discharge control collar to a pressure in excess of a predetermined pressure to apply a lifting force to the fuel-discharge control collar to move the fuel-discharge control collar in an axially outward direction away from the closure support to open the flow-diversion passageway.

19. The assembly of claim 18, further comprising a filler neck closure housing containing the closure support and an appearance door mounted for movement relative to the filler neck closure housing to open and close an outer aperture that is formed in the filler neck closure housing and is sized to receive a fuel-dispensing pump nozzle therein, and wherein the filler neck closure housing includes a top wall positioned to lie in spaced-apart relation to the closure support and a side wall arranged to extend between the top wall and the closure support to define an interior region of the filler neck closure housing, and the axially outwardly facing funnel-shaped surface of the closure support and the side wall of the filler neck closure housing cooperate to define the spray-diversion region therebetween in the interior region of the filler neck closure housing.

20. A filler neck closure assembly for a vehicle fuel tank filler neck, the assembly comprising a filler neck closure housing including a top wall formed to include an outer aperture, a bottom wall arranged to lie in spaced-apart relation to the top wall and formed to include an inner aperture, and a side wall arranged to extend between the top and bottom walls to define an interior region of the filler neck closure housing, the filler neck closure housing being adapted to be coupled to a vehicle fuel tank filler neck to receive in the interior region thereof pressurized fuel vapor discharged from the filler neck through the inner aperture formed in the bottom wall, a nozzle receiver mounted in the interior region of the filler neck closure housing, the nozzle receiver including a closure support formed to include a pump nozzle-receiving passageway and a closure plate mounted on the closure support for movement between a closed position closing the pump nozzle-receiving passageway and an opened position opening the pump nozzle-receiving passageway to admit a fuel-dispensing pump nozzle therein during fuel tank refueling, and a fuel-discharge control collar formed to include a collar aperture adapted to receive a fuel-dispensing pump nozzle therein, the fuel-discharge control collar being positioned to move in the pump nozzle-receiving passageway between a closed position blocking flow of pressurized liquid fuel and fuel vapor through a flow-diversion passageway defined between the fuel-discharge control collar and the closure support and an opened position allowing flow of pressurized liquid fuel and fuel vapor through the flow-diversion passageway to a flow-diversion region formed in the interior region of the filler neck closure housing along an inner surface of the side wall.

21. A filler neck closure assembly for a vehicle fuel tank filler neck, the assembly comprising a filler neck closure housing including a top wall formed to include an outer aperture, a bottom wall arranged to lie in spaced-apart relation to the top wall and formed to include an inner aperture, and a side wall arranged to extend between the top and bottom walls to define an interior region of the filler neck closure housing, the filler neck closure housing being adapted to be coupled to a vehicle fuel tank filler neck to receive in the interior region thereof pressurized fuel vapor discharged from the filler neck through the inner aperture formed in the bottom wall, a nozzle receiver mounted in the interior region of the filler neck closure housing and formed to include a pump nozzle-receiving passageway adapted to admit a fuel-dispensing pump nozzle therein during fuel tank refueling, and a fuel-discharge control collar formed to include a collar aperture adapted to receive a fuel-dispensing pump nozzle therein, the fuel-discharge control collar being positioned to move in the pump nozzle-receiving passageway away from the top wall of the filler neck housing to a closed position blocking flow of pressurized liquid fuel and fuel vapor through a discharge channel defined between the fuel-discharge control collar and the nozzle receiver, and toward the top wall of the filler neck housing to an opened position allowing flow of pressurized liquid fuel and fuel vapor through the discharge channel.

\* \* \* \* \*